United States Patent
Bond (10) Patent No.: US 8,527,671 B2
(45) Date of Patent: Sep. 3, 2013

(54) DMA ENGINE

(75) Inventor: Andrew Glyn Bond, Redland (GB)

(73) Assignee: Icera Inc., Wilmington, DE (US)

( * ) Notice: Subject to any disclaimer, the term of this patent is extended or adjusted under 35 U.S.C. 154(b) by 452 days.

(21) Appl. No.: 12/643,674

(22) Filed: Dec. 21, 2009

(65) Prior Publication Data

US 2010/0185789 A1  Jul. 22, 2010

(30) Foreign Application Priority Data

Jan. 16, 2009 (GB) .................................. 0900758.4

(51) Int. Cl.
G06F 13/28 (2006.01)
G06F 13/00 (2006.01)

(52) U.S. Cl.
USPC ................. 710/22; 710/53; 710/57; 710/110; 710/310

(58) Field of Classification Search
USPC ........................................................... 710/22
See application file for complete search history.

(56) References Cited

U.S. PATENT DOCUMENTS

| 5,623,622 | A | | 4/1997 | Yuki et al. | |
|---|---|---|---|---|---|
| 5,771,356 | A | * | 6/1998 | Leger et al. | 709/233 |
| 5,983,304 | A | | 11/1999 | Jin | |
| 7,698,481 | B1 | * | 4/2010 | Nguyen | 710/57 |
| 2008/0005405 | A1 | * | 1/2008 | Innis et al. | 710/56 |

FOREIGN PATENT DOCUMENTS

| JP | 61091756 A | 5/1986 |
|---|---|---|
| JP | 2002342258 A | 11/2002 |
| WO | 2006-117562 A1 | 11/2006 |

* cited by examiner

*Primary Examiner* — Idriss N Alrobaye
*Assistant Examiner* — Brooke Taylor (57) ABSTRACT

Disclosed herein is a method of accessing a slave device from a circuit including a central processing unit, a data transfer engine, and an interface to the slave device. In one embodiment, the method includes: executing code on the central processing unit to set up the data transfer engine to access the slave device; and based on the set-up, operating the data transfer engine to supply a read request word to a transmit buffer of the interface for transmission to the slave device, and, after return of a corresponding response word to a first-in-first-out receive buffer of the interface, to disable the first-in-first-out receive buffer from receiving any further data such that the last word therein is assured to be the response word. The method further includes using an underflow mechanism of the first-in-first-out receive buffer to determine the last word therein and hence determine the response word.

29 Claims, 6 Drawing Sheets

DMA ENGINE

CROSS-REFERENCE TO RELATED APPLICATION

This application claims the benefit of GB Application No. 0900758.4 filed Jan. 16, 2009, entitled "DMA ENGINE," commonly assigned with this application and incorporated herein by reference.

TECHNICAL FIELD

This application is directed, in general, to transferring data between devices, and, more specifically, to transferring data directly between memory devices and/or other memory-addressable devices.

BACKGROUND

A direct memory access (DMA) engine moves a portion of data from a source device to a destination device autonomously from CPU control. An individual DMA transfer is configured by setting up the DMA engine to fetch a descriptor from memory, which contains a description of the transfer to be performed. A DMA descriptor normally contains: the source address of the data to be transferred, the destination address for that data, a number of control parameters, and often a link to a subsequent transfer for the DMA engine to process once complete. Usually a DMA engine will be constructed of a number of independent contexts processing transfers in parallel, each context having dedicated hardware.

One potential source of data for a DMA transfer is an interface with a peripheral slave device. Commonly, when a DMA engine reads data from a slave device, the data must be interrogated to determine its relevance. This can involve interrupting the usual CPU flow to process the received data, which in real-time software can adversely affect performance. Alternatively all received data can be copied into a memory buffer to be processed later. Depending on the activity across the interface this can result in large amounts of data to process, increasing the overall CPU load.

It would be advantageous to reduce the CPU overhead required to find the desired data.

SUMMARY

According to one aspect of the present invention, there is provided a method of accessing a slave device from a circuit including a central processing unit, a data transfer engine, and an interface to the slave device. In one embodiment, the method includes: executing code on the central processing unit to set up the data transfer engine to access the slave device; based on the set-up, operating the data transfer engine to supply a read request word to a transmit buffer of the interface for transmission to the slave device, and, after return of a corresponding response word to a first-in-first-out receive buffer of the interface, to disable the first-in-first-out receive buffer from receiving any further data such that the last word therein is assured to be the response word; and using an underflow mechanism of the first-in-first-out receive buffer to determine the last word therein and hence determine the response word.

According to another aspect of the present invention, there is provided a circuit. In one embodiment, the circuit includes: a central processing unit; an interface for accessing a slave device, the interface comprising a transmit buffer for transmitting to the slave device, a first-in-first-out receive buffer for receiving from the slave device, and an underflow mechanism associated with the first-in-first out receive buffer; a data transfer engine coupled between the interface and the central processing unit; and a memory, coupled to the central processing unit, storing code arranged to be executed on the central processing unit to set up the data transfer engine to access the slave device by: based on the set-up, operating the data transfer engine to supply a read request word to the transmit buffer of the interface for transmission to the slave device, and, after return of a corresponding response word to the first-in-first-out receive buffer of the interface, to disable the first-in-first-out receive buffer from receiving any further data such that the last word therein is assured to be the response word; and use the underflow mechanism of the first-in-first-out receive buffer to determine the last word therein and hence determine the response word.

According to yet another aspect of the present invention, there is provided a computer program product for accessing a slave device from a circuit. In one embodiment, the computer program product includes: a central processing unit, a data transfer engine, and an interface to the slave device; the program comprising code configured so as when executed on the central processing unit to: set up the data transfer engine to access the slave device; based on the set-up, operate the data transfer engine to supply a read request word to a transmit buffer of the interface for transmission to the slave device, and, after return of a corresponding response word to a first-in-first-out receive buffer of the interface, to disable the first-in-first-out receive buffer from receiving any further data such that the last word therein is assured to be the response word; and use an underflow mechanism of the first-in-first-out receive buffer to determine the last word therein and hence determine the response word.

BRIEF DESCRIPTION

Reference is now made by way of example to the following descriptions taken in conjunction with the accompanying drawings, in which.

DETAILED DESCRIPTION

The disclosure recognizes that in communicating with an external slave, DMA transfers can be configured to either improve throughput or to reduce the required CPU interaction and therefore overhead. When the required throughput to and from an external slave device is low, but at the same time the CPU's load is high because it is occupied with other tasks such as arithmetic operations or servicing other devices, then it would be desirable to find a DMA scheduling technique that takes advantage of the low throughput requirement of the slave to reduce or eliminate the interruptions to the CPU needed to service the incoming data from the external slave, and thus reduce or eliminate the additional CPU load required to read from that device.

As disclosed herein, by selectively disabling a first-in-first-out receive buffer, it can advantageously be known that the last (most recently received) word in that buffer is the desired response. By means of a suitable underflow mechanism of the receive buffer, this knowledge can be used to reduce or even eliminate the CPU overhead required to find the desired response.

For example, the underflow mechanism may include a stall mechanism whereby a stall is generated when the first-in-first-out receive buffer contains fewer words than a lower stall threshold, and the determination of the last word may include executing code on the central processing unit to read from the first-in-first-out receive buffer until empty, the central processing unit determining when the first-in-first-out receive buffer is empty by reference to the stall of the first-in-first-out receive buffer. This requires only minimal CPU overhead to find the desired word.

In another example, the underflow mechanism is configured to output the last validly read word upon underflow of the first-in-first-out receive buffer, and the determination of the last word includes operating the data transfer engine to read a number of words from the first-in-first-out receive buffer sufficient to cause underflow. This need not require any CPU overhead.

In one embodiment, a transmit buffer may be a first-in-first-out buffer. The operation of the data transfer engine may include, based on the set up, processing a sequence of descriptors in the data transfer engine. In one embodiment, processing of the sequence of descriptors may include: processing a first descriptor operating the data transfer engine to input the read request word into the first-in-first-out transmit buffer; processing one or more subsequent descriptors operating the data transfer engine to input a number of additional words into the first-in-first-out transmit buffer behind the read request word, the number being at least sufficient to fill the first-in-first-out transmit buffer to an upper stall threshold and arranged so as to generate a stall until the response word has been returned from the slave device; and following the subsequent descriptors in the sequence and synchronized to release of the stall of the first-in-first-out transmit buffer, processing one or more control descriptors operating the data transfer engine to perform the disabling of the first-in-first-out receive buffer.

By placing these additional words behind the desired read request in order to stall the transmit buffer, followed by a descriptor to disable the receive buffer, this means that stall properties of the transmit buffer are exploited to ensure that the disabling of the receive buffer is properly synchronized with the return of the desired response word. Thus, a custom sequence of descriptors can be used to ensure the correct synchronization, rather than having to rely on any intervention from the CPU or having to modify the interface or data transfer engine to include any special dedicated hardware. Instead, the custom descriptor sequence can be used to operate the existing stall mechanism of the transmit buffer to ensure the receive buffer is disabled at the correct point. In further embodiments, the number of additional words into the first-in-first-out transmit buffer behind the read request word may be equal to the stall threshold of the first-in-first-out transmit buffer.

The processing of the sequence of descriptors may include, prior to the subsequent descriptors in the sequence, processing one or more control descriptors operating the data transfer engine to enable the first-in-first-out receive buffer to receive data. The sequence may include a series of linked descriptors, each operating the data transfer engine to process the next in the sequence, and the set-up by the processor may include identifying only an initial descriptor in the sequence.

In one embodiment, at least one of the additional words into the first-in-first-out transmit buffer behind the read request word may include a dummy read request word. Additionally, the upper stall threshold of the first-in-first-out transmit buffer may be its maximum capacity in words such that it stalls when full. The upper stall threshold of the first-in-first-out transmit buffer may be programmable, such that it can be set to a number of words less than a maximum capacity of the transmit buffer.

The lower stall threshold of the first-in-first-out receive buffer may be zero words such that it stalls when empty. The lower stall threshold of the first-in-first-out receive buffer may be programmable, such that it can be set to greater than zero words.

In one embodiment, the disclosure provides a method that may include executing code on the central processing unit to operate the circuit as a wireless modem. Those skilled in the art to which this application relates will appreciate that other and further additions, deletions, substitutions and modifications may be made to the described embodiments.

Figure 1:
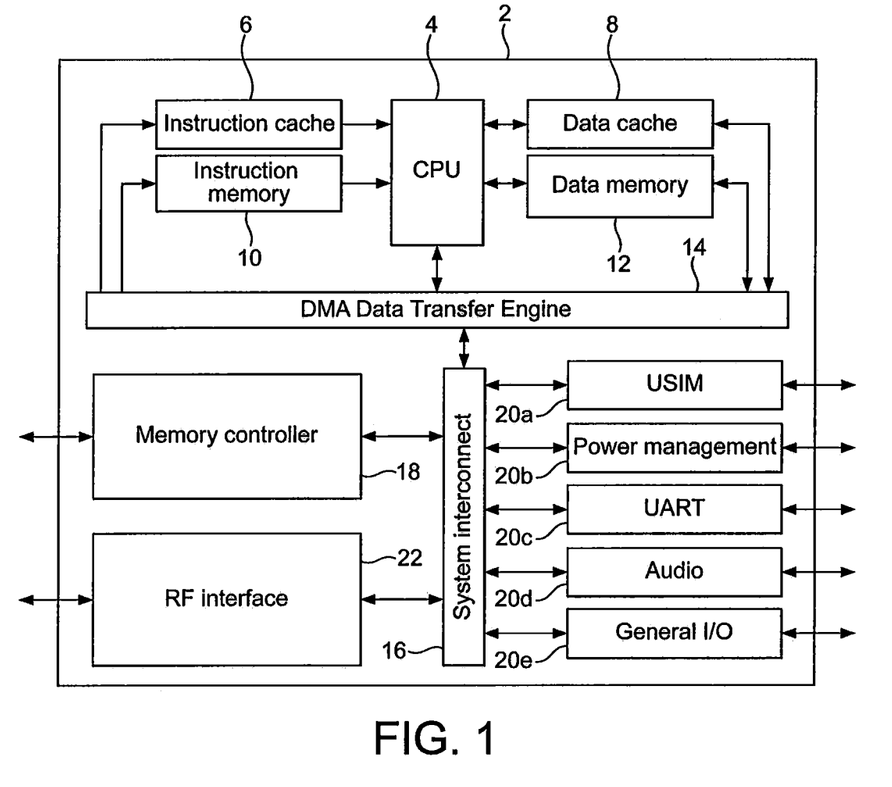
FIG. 1 is a schematic block diagram of an integrated circuit having a processor.

As an example application of the present invention, FIG. 1 schematically illustrates an integrated circuit (IC) chip 2 for use in user equipment such as a mobile phone or other mobile terminal. The circuit 2 includes a central processing unit (CPU) 4 to which is coupled an instruction memory 10, a data memory 12, an instruction cache 6, and a data cache 8. The circuit 2 includes a data transfer engine in the form of a DMA Engine 14. Each of the instruction memory 10, data memory 12, instruction cache 6 and data cache 8 are coupled to the DMA engine 14, which in turn is coupled to a system interconnect 16 comprising a data bus and an address bus. The CPU 4 is also operatively coupled to the DMA engine 14.

The system interconnect 16 couples between the DMA engine 14 and various on-chip devices in the form of peripheral interfaces 18, 20 and 22, which in turn connect to external peripheral devices, i.e., external to the integrated circuit 2. These include a memory controller 18, a radio frequency (RF) interface 22 and one or more other peripheral interfaces 20. The memory controller 18 connects to one or more external memory devices (not shown). For example, the memory controller 18 may support a connection to a RAM such as SDRAM or mobile DDR, to flash memory such as NAND flash or NOR flash, and/or to a secure ROM. The RF interface 22 connects with an external RF front-end and antenna (also not shown), and ultimately with a wireless cellular network over an air interface. Each of the one or more other peripheral interfaces 20 connects to a respective external peripheral (also not shown). For example, the peripheral interfaces 20 may include a USIM interface 20a, a power management interface 20b, a UART interface 20c, an audio interface 20d, and/or a general purpose I/O interface 20e.

At least one of the interfaces 20 is an interface to an external slave device, the chip 2 being the master acting under control of the CPU 4. This means a read is initiated by the master, and a response received back from the slave directly relates to a particular read request transmitted by the master. The slave cannot autonomously send data to the master, and the timing of the response relative to the read request is predictable to the master.

For example, in a one embodiment one or more of the interfaces 20, such as the general purpose interface 20e, may be configured as a Serial Peripheral Interface (SPI).

In one embodiment, the chip 2 used is designed by Icera and sold under the trade name Livanto®. Such a chip has a specialized processor platform described, for example, in WO2006/117562.

In one embodiment of an application of the present invention, the integrated circuit 2 is configured as a software modem, or "soft modem", for handling wireless communications with a wireless cellular network. The principle behind software modem is to perform a significant portion of the signal processing and other functions required for the wireless communications in a generic, programmable, reconfigurable processor, rather than in dedicated hardware.

The software modem may be a soft baseband modem. That is, on the receive side, all the radio functionality from receiving RF signals from the antenna up to and including mixing down to baseband is implemented in dedicated hardware. Similarly, on the transmit side, all the functionality from mixing up from baseband to outputting RF signals to the antenna is implemented in dedicated hardware. However, all functionality in the baseband domain is implemented in software stored in the instruction memory 10, data memory 12 and external memory, and executed by the CPU 4.

In one implementation, the dedicated hardware in the receive part of the RF interface 22 may include a low noise amplifier (LNA), mixers for downconversion of the received RF signals to intermediate frequency (IF) and for downconversion from IF to baseband, RF and IF filter stages, and an analog to digital conversion (ADC) stage. An ADC is provided on each of in-phase and quadrature baseband branches for each of a plurality of receive diversity branches. The dedicated hardware in the transmit part of the RF interface 22 may include a digital to analog conversion (DAC) stage, mixers for upconversion of the baseband signals to IF and for upconversion from IF to RF, RF and IF filter stages, and a power amplifier (PA). Optionally, some of these stages may be implemented in an external front-end (in which case the RF interface may not necessarily input and output RF signals per se, but is still referred to as an RF interface in the sense that it is configured to communicate up/downconverted or partially processed signals with the RF front-end for the ultimate purpose of RF communications). The RF interface 22 may include an analog RF interface and/or a digital radio interface such as a DigRF interface. Details of the required hardware for performing such radio functions will be known to a person skilled in the art.

Received data is passed from the RF interface 22 to the CPU 4 for signal processing, via the system interconnect 16, data transfer engine 14 and data memory 12. Data to be transmitted is passed from the CPU 4 to the RF interface 22 via the data memory 12, DMA engine 14 and system interconnect 16.

The software running on the processor 4 may then handle functions such as: modulation and demodulation, interleaving and de-interleaving, rate matching and de-matching, channel estimation, equalization, rake processing, bit log-likelihood ratio (LLR) calculation, transmit diversity processing, receive diversity processing, Multiple-Input Multiple-Output (MIMO) processing, voice codecs, link adaptation by power control or adaptive modulation and coding, and/or cell measurements.

As mentioned, a DMA engine moves a portion of data from source to destination address autonomously from CPU control. Specifically, the DMA engine allows data to be transferred directly between memory devices and/or other memory-addressable devices such as peripheral interfaces without that data needing to pass via the CPU 4. Without DMA, the CPU would have to read data from the destination device into one or more of the CPU's operand registers, and then write that data from its operand registers to the destination device. This would be wasteful of processor resources, especially where several bytes are to be transferred, because the CPU would have to be occupied throughout the entire transfer. But using DMA, software running on the CPU 4 simply sets up the DMA engine 14 to transfer the data directly by supplying it with an indication allowing the relevant descriptor or descriptors to be fetched from a suitable memory location (the descriptor normally containing the source address, destination address, a number of control parameters and a link to the next transfer for the data transfer engine 14 engine to process once complete). After the set up, the CPU 4 can then continue with other tasks whilst the DMA engine 14 completes the transfer independently of the CPU 4 based on the fetched descriptor(s).

Note that, as will be familiar to a person skilled in the art, the phrase "Direct Memory Access" does not limit the DMA engine to performing transfers involving memory devices. More generally, the transfer can be between any "memory mapped" or "memory addressable" device, meaning any device which is accessed by means of an address in a similar manner to a memory location. So in the example shown, the peripherals interfaces 18, 20 and 22 are incorporated into the same addressing scheme as that of the memory devices 6, 8, 10 and 12, and are accessible via the system interconnect 16 by means of memory-mapped registers in the peripheral interfaces 18, 20 and 22. So for example, the DMA engine 14 could be used to transfer data directly between two peripheral interfaces 20, between two peripheral interfaces 18, 20 and/or 22, or between a peripheral interface 18, 20 or 22 and a memory device 6, 8, 10 or 12.

Figure 2:
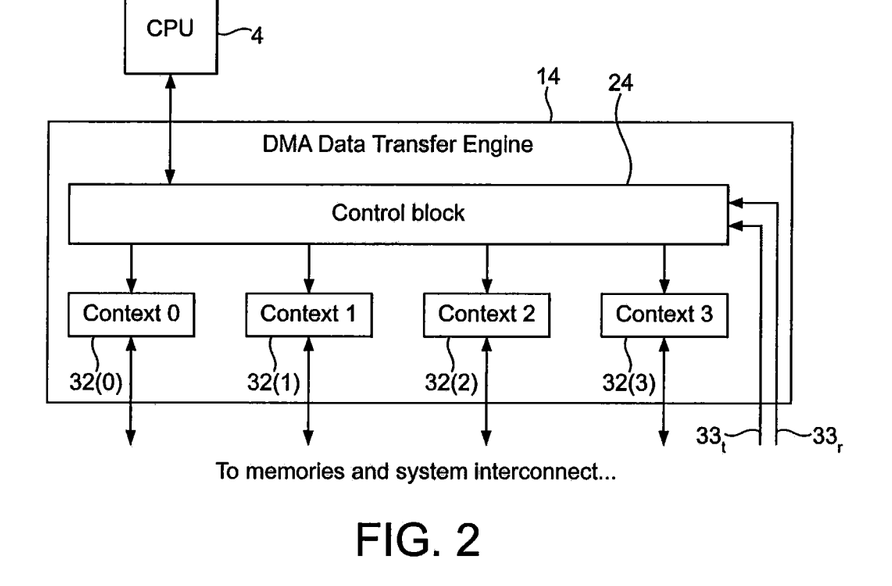
FIG. 2 is a schematic block diagram of a DMA engine.

An example DMA engine 14 according to one embodiment of the present invention is now discussed in more detail with reference to the schematic block diagram of FIG. 2.

The DMA engine 14 includes a control block 24 and a plurality of parallel DMA contexts 32(0) ... 32(3). There may be any number of contexts, perhaps in the region of forty, but for illustrative purposes only four are shown here. The control block 24 is coupled to the CPU 4 and to each of the contexts 32. Each context 32 has available fetch circuitry for fetching DMA descriptors specified by software executed on the CPU 4 in the setup, and transfer circuitry for performing the DMA transfer described by descriptor fetched by that context's fetch circuitry. Each of the fetch and transfer circuitry of each context is coupled to the system interconnect 16 and memory devices 6, 8, 10 and 12. It should be noted that separate hardware to perform descriptor fetch and data transfer is not necessarily provided for every context, especially if there is a large number of contexts such as forty. In embodiments, contexts can share the hardware for performing descriptor fetches and/or the hardware for performing data transfers based on fetched descriptor, e.g. by allocating a smaller number of fetch units and/or transfer units to the contexts as and when they are needed.

The control block 24 is coupled to each of the peripheral interfaces 18, 20 and 22 by a respective pair of stall wires $33_t$ and $33_r$ (only one pair is shown for simplicity). The function of these will be discussed later.

In operation, code executed on the CPU 4 sets up a DMA transfer by supplying an indication of a descriptor from the CPU 4 to the control block 24 of the DMA engine 14. The indication may include a memory address from which the descriptor is to be fetched. The control block 24 allocates one of the contexts 32(0) ... 32(3) for handling the transfer, and the allocated context 32 fetches the descriptor from the indicated memory address. As mentioned, the descriptor is a description of the transfer to be performed: it contains the address of the source device and address of the destination device for the transfer (as well as one or more control parameters). Thus the source and destination for the DMA transfer are identified in the fetched descriptor.

A descriptor of one transfer may also link to another descriptor corresponding to the next transfer for the DMA engine to process once that transfer is complete. Thus it is possible to create a series of linked descriptors, so that a whole chain of two or more transfers may be set up by the CPU 4 supplying an indication of only one descriptor, i.e., the first descriptor in the series.

Figure 3:
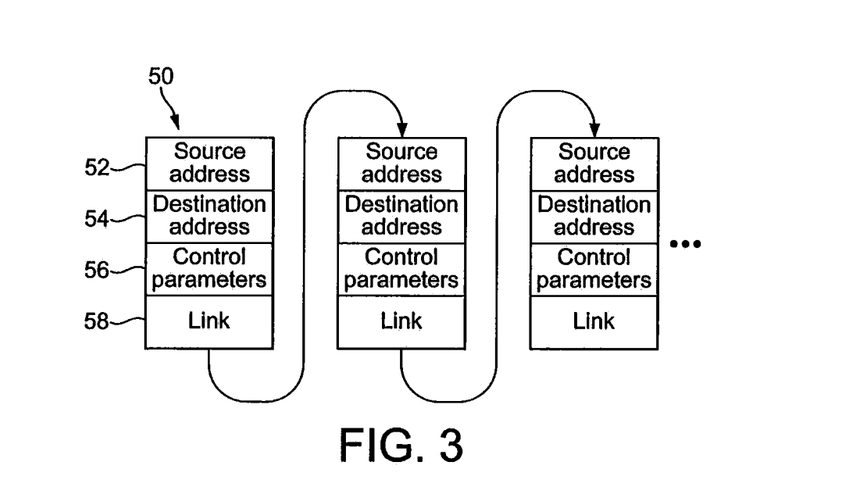
FIG. 3 is a schematic representation of a series of linked descriptors.

A series of linked descriptors is illustrated schematically in FIG. 3, which shows a plurality of descriptors 50 each comprising a respective source address 52, destination address 54, one or more control parameters 56, and a link 58 to the next descriptor. The allocated context 32 fetches and processes each descriptor 50 in turn, with the CPU 4 only needing to indicate the first descriptor to set up the corresponding whole chain of transfers.

Linked descriptors can be used for example to perform transfers of large amounts of data that cannot be set up using a single descriptor, or discontinuous transfers where the source and/or destination addresses are not continuous, or circular transfers where data is to be transferred repeatedly to or from a certain address or addresses.

Note also that some special descriptors may operate the DMA engine 14 to perform functions other than the actual transfer of data from a source to a destination device, particularly to control the source and/or destination devices in relation a transfer. For example, a certain descriptor (or depending on system architecture, a certain chain of descriptors) may cause the DMA engine 14 to enable or disable a transmit or receive buffer of the target device. In this case, the descriptor may need to contain the address of only one target device, e.g. the device whose buffer is being enabled or disabled. Other than this and their differing function, these special control descriptors are fetched and handled by the DMA engine 14 in a similar manner to normal descriptors. This includes the fact that the control descriptors can be part of a series of linked descriptors as in FIG. 3.

Figure 4:
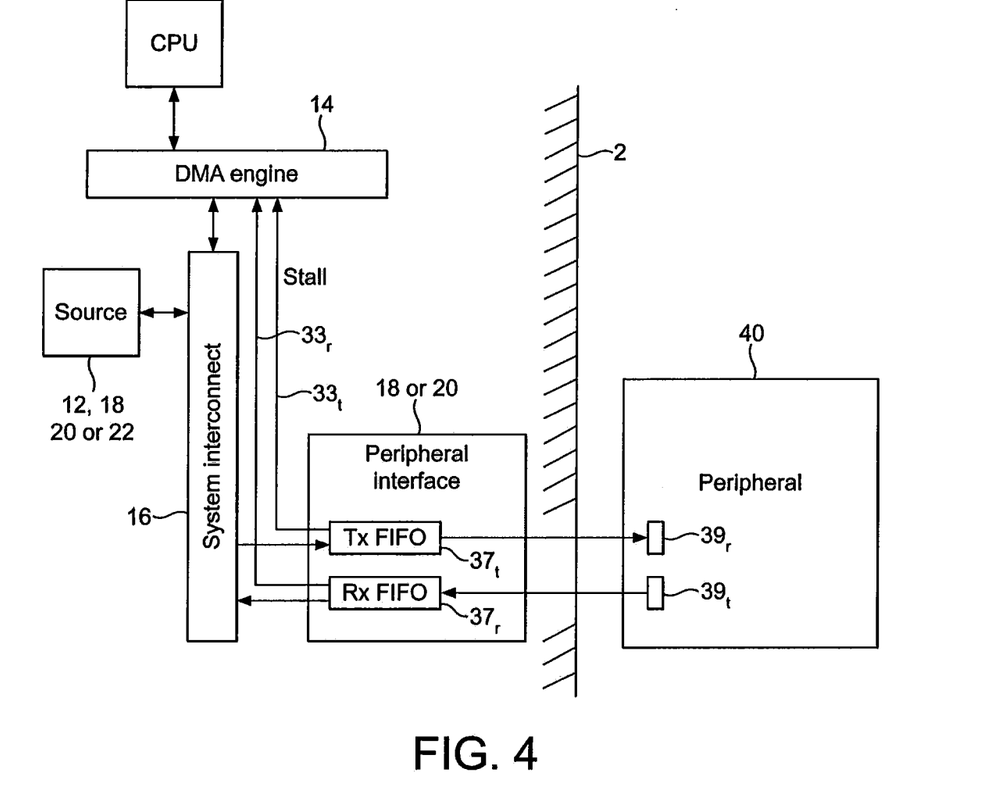
FIG. 4 is a part of the circuit of FIG. 1.
Figure 5:
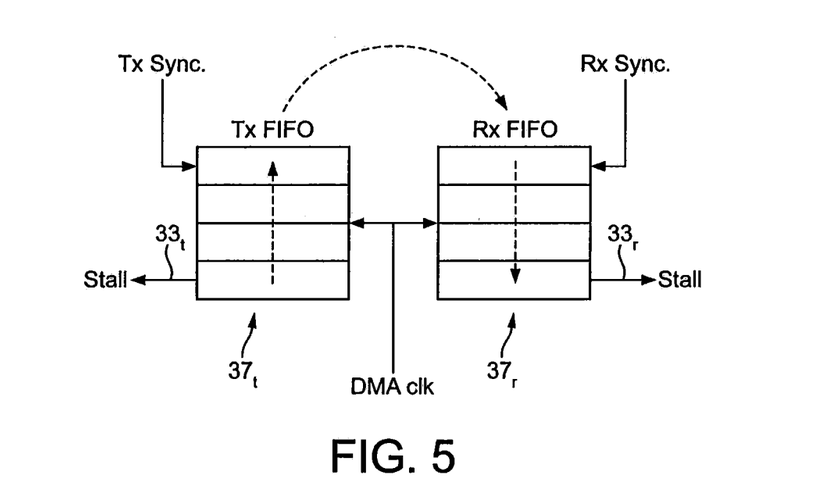
FIG. 5 is a schematic block diagram of transmit and receive buffers.

Reference is now made to the simplified block diagrams of FIGS. 4 and 5, in which only one peripheral interface 20 to an external slave device 40 is shown. For example, this could be an SPI interface, with the chip 2 being the master device such that the CPU 4, DMA engine 14 and interface 20 are on the master side.

The interface 20 includes a transmit buffer $37_t$ and a receive buffer $37_r$, each being a "first in, first out" (FIFO) buffer. As will be familiar to a person skilled in the art, this means the buffer includes a plurality of equally sized slots which are arranged to hold, shift through and output correspondingly sized words of data all in the order in which they were input to the buffer. That is, the FIFO is arranged to queue data words. Note that the term "word" as used herein has no specific meaning other than a portion of data of a suitable size for the slots of the FIFOs, and does not otherwise limit to any one particular size (although word size is typically related to system architecture).

The slave device 40 includes a receive register $39_r$ and a transmit register $39_t$. The master transmit FIFO $37_t$ has its input coupled to the DMA engine 14 via the system interconnect 16, and its output connected to the input of the slave receive register $39_r$. The slave receive register $39_r$ has its output coupled to the internal circuitry of the slave device 40. The slave transmit register $39_t$ has its input coupled to the internal circuitry of the slave. The master receive FIFO $37_r$ has its input connected to the output of the slave transmit register $39_t$, and its output connected to the DMA engine 14 via the system interconnect 16. Note: the transmit and receive registers 39 of the slave 40 need not be FIFOs.

The transmit FIFO $37_t$ is also coupled to the control block 24 via a transmit stall wire $33_t$ and the receive FIFO $37_r$ is coupled to the control block 24 via a receive stall wire $33_r$. It will be understood that a similar mechanism is provided on the chip 2 for the other devices to or from which the DMA engine 14 can perform transfers. A source device is also shown, which could for example be any of devices 12, 18, 20 or 22 in FIG. 1 or another device.

In operation, the DMA engine 14 fetches and processes a descriptor, and based on that descriptor supplies data in the form of a read request word to the input of the transmit FIFO $37_t$ of the interface 20 (from the source device 42 via the system interconnect 16). The interface 20 is the destination target device as far as the descriptor and DMA engine 14 are concerned, i.e. they do not need to know where the read request is transmitted from there. Once input to the master transmit FIFO $37_t$, the read request packet is shifted through the FIFO $37_t$ and transmitted to the receive register $39_r$ of the external slave device 40, from whence it is supplied to the internal circuitry of the slave 40. The slave 40 processes the read request in whatever manner is required, depending on the function of the slave 40, and generates a corresponding response word. For example, if the slave 40 is a memory device, the read request may request some data to be read from a particular external memory address, and the response may return the required data from memory. In another example, if the slave 40 is a user input device, the read request could be to poll the user input device for input data, and the response could be to return the result requested by that polling. In another example, the read request could be to query a status of the slave, and the response would be an indication of the requested status. Whatever the response, the response word is supplied by the slave's internal circuitry to the slave transmit register $39_t$, from whence it is transmitted to the input of the master receive FIFO $37_r$. The response word is then shifted through and read from the output of the master receive FIFO $37_r$ by the CPU 4 or by a further DMA transfer with the interface 20 as the source device.

Note: in the embodiment shown in FIG. 1, the CPU 4 can read the peripheral interface 20 directly (as well as other components 18, 22 connected to the system interconnect 16), These direct accesses from the CPU 4 are routed through the DMA engine 14, but not using the DMA functionality (i.e. no descriptors or contexts are used). In alternative embodiments, a more traditional chip may have the DMA engine to the side of the CPU, both connected to the interconnect independently.

As mentioned, each read request word transmitted from the processor chip 2 (master) corresponds to a read response word received back from the external peripheral 40 (slave). Referring to FIG. 5, the path of a read request word through the transmit FIFO $37_t$ and corresponding read response word back through the receive FIFO $37_r$ in the interface 20 is shown by the dotted arrows. The transmit and receive FIFOs 37 are connected to a clock of the DMA engine, and thus receive a DMA clock signal (e.g., the same clock as used by the DMA engine 14).

Once a relevant descriptor has been processed by the DMA engine 14 so as to make a read request word available for transmission, the read request word is shifted into the rearmost slot (leftmost in FIG. 5) of the transmit FIFO $37_t$ on a tick of the DMA clock signal. The read request word is then shifted through each successive slot of the transmit FIFO $37_t$ on respective subsequent ticks of the DMA clock signal (assuming at each stage that the slot ahead is free, i.e. not occupied by another word which cannot itself yet be shifted onwards). When the read request word has reached the front-most slot (rightmost in FIG. 5), it is thus made available for transmission to the receive register $39_r$ of the external slave 40.

To transmit the read request word, the interface 20 shifts the word bit-by-bit from the front-most slot of the transmit buffer $37_t$ to the receive register $39_r$ of the slave 40 (at least in the case of a serial interface such as SPI). However, the interface 20 only frees the front-most slot once the entire word has been fully transmitted and the corresponding response word has been fully received back into the receive FIFO $37_r$ (as indicated to the transmit FIFO $37_t$ by a "Tx Sync" signal in FIG. 5). Therefore throughout the interface read cycle whilst data is exchanged between the interface 20 and slave 40, the front-most slot is effectively still considered occupied and prevents advancement of any following word immediately behind it in the queue of the transmit FIFO $37_t$ (note though that the principles of the present invention can still apply if this is not the case—see last paragraph). Any word immediately behind that will also be blocked from advancing through the FIFO, and so on, although any word with a free slot still between it and a forward blocked slot may still advance on the DMA clock tick whilst that is the case.

In response to receiving the read request word, the internal circuitry of the slave 40 generates a corresponding response word which it inputs to the slave transmit register $39_t$. From there, the response word is transmitted back bit-by-bit to the interface 20 on the master side (again assuming a serial interface). The response word is received bit-by-bit into a pre-stage of the receive FIFO $37_r$ (not shown), and only once the whole response word has been received does the interface 20 allow the receive FIFO $37_r$ to shift that response word into the rear-most slot (as indicated to the receive FIFO $37_r$ by a "Rx Sync" signal in FIG. 5). When thus allowed, the response word is shifted into the rear-most slot (rightmost in FIG. 5) of the receive FIFO $37_r$ on a tick of the DMA clock signal. Also, as mentioned, once the response word has been received into the rear-most slot of the receive FIFO $37_r$ then the corresponding request word can be cleared from the front-most slot of the transmit FIFO $37_t$ (and thus the other words in the transmit FIFO $37_t$ shifted onwards and the stall released).

The response word is then shifted through each successive slot of the receive FIFO $37_r$ on respective subsequent ticks of the DMA clock signal. Of course, the receive FIFO $37_r$ may already contain other words from previous read requests to the slave 40, and so the response word in question is initially only shifted through as far as the front-most (leftmost in FIG. 5) free slot, i.e. front-most slot that is not occupied by another word which cannot itself yet be shifted onwards. The CPU 4 or DMA engine 14 reads each word in turn from the front-most slot of the FIFO $37_r$, with all following words in the queue being shifted forwards by one slot on a tick of the DMA clock once the front-most slot has been read. When the response word in question has reached the front-most slot of the receive FIFO $37_r$ (leftmost in FIG. 5), it is thus made available to be read by the CPU 4 or by another DMA transfer with the interface 20 as a source.

Note that the interface read cycle is much longer than the DMA clock cycle (typically at least an order of magnitude longer), i.e. so the transmit and receive FIFOs 37 can perform many slots' worth of internal shifts in the time while one word is being transmitted bit-by-bit to the slave 40 from the front-most slot of the transmit FIFO $37_t$ and a corresponding word received back bit-by-bit to the receive FIFO $37_r$. Note also that the interface read cycle is much longer that the DMA descriptor cycle (typically at least an order of magnitude longer), i.e. so that the DMA engine 14 can process many descriptors in the time while one word is being transmitted bit-by-bit to the slave 40 from the front-most slot of the transmit FIFO $37_t$ and a corresponding word received back bit-by-bit to the receive FIFO $37_r$. Although, to process a DMA descriptor may take multiple DMA clock cycles, and therefore one DMA descriptor cycle may be much longer than a DMA clock cycle (again perhaps an order of magnitude longer). "Much longer" here means the time taken to shift a word through the FIFO is negligible compared to the time taken to transmit or receive a word bit-by-bit between interface and slave, and that the time taken to process a descriptor is negligible compared to the time taken to transmit or receive a word bit-by-bit between interface and slave; and potentially also that the time taken to shift a word through the FIFO is negligible compared to the time taken to process a descriptor. These timing relationships may be expressed by the inequality:

$$\text{DMA clock period} \ll \text{DMA descriptor cycle} \ll \text{interface cycle}$$

During the relatively long time taken to transmit a word to the slave 40 and receive back a response, the transmit FIFO $37_t$ may become full with other following words shifted in behind it (i.e. the FIFO becomes "backed up" such that all slots are occupied and the word in the rear-most slot is blocked from advancing). When that happens, the transmit FIFO $37_t$ asserts a stall signal on the transmit stall wire $33_t$, which is detected by the control block 24 of the DMA engine 14. Alternatively, the stall could be asserted when the transmit FIFO $37_t$ reaches a programmable upper stall threshold which can be lower than the absolute stall threshold (i.e. lower than the absolute maximum capacity of the transmit FIFO $37_t$). The transmit stall signal is not released until: the word in the front-most slot of the transmit FIFO $37_t$ has been fully transmitted the corresponding response word has been received back at the receive FIFO $37_r$, the front-most slot of the transmit FIFO $37_t$ has then been freed, and the following words in the transmit FIFO $37_t$ have each been shifted forwards by one slot on a tick of the DMA clock signal thus freeing the rear-most slot.

In response to the stall, the control block 24 prevents the allocated context 32 from processing any more related descriptors in the sequence which would supply data to the transmit FIFO $37_t$, until the transmit stall signal is de-asserted. In the case of a series of linked descriptors, this may be achieved by preventing the context 32 from processing the next descriptor in the chain, if it would input to the transmit FIFO $37_t$, until the transmit stall signal is de-asserted (an alternative technique may be for example to prevent processing any more descriptors attempting to supply data to the same target). Note also that the sequence must be processed in order, so any special control descriptors which do not themselves input to the transmit FIFO $37_t$ but which follow such a descriptor in the sequence also cannot be processed: the whole sequence following that point must be suspended pending release of the stall. In this sense, descriptors can be the to be synchronized to the transmit FIFO stall.

Furthermore, when the receive FIFO $37_r$ becomes empty, it asserts a stall signal on the receive stall wire $33_r$, which is detected by the control block 24 of the DMA engine 24 and/or CPU 4. Alternatively, the stall could be asserted when the receive FIFO $37_r$ falls to a lower programmable stall threshold which is greater than absolute stall threshold (i.e. greater than zero slots).

Of the multiple words incoming through the receive FIFO $37_r$, it may be necessary to determine which particular one is relevant to a certain task or purpose. As mentioned, conventionally this would require the incoming data to be interrogated by either interrupting the usual CPU flow to process the incoming data (which in real-time software can adversely affect performance) or copying the incoming data into a memory buffer to be processed later (which could result in large amounts of data to process, increasing the overall CPU load).

The stalls of the transmit and receive FIFOs 37 are conventionally only used to prevent the DMA engine attempting to input to a full transmit FIFO or read from an empty receive FIFO. However, in some embodiments of the present invention, such stall properties can also be used to help locate required data amongst data received from a slave device and thus reduce or eliminate the CPU overhead needed to do so.

In a one embodiment, this is achieved by creating a custom descriptor sequence comprising enough read requests to stall the transmit FIFO $37_t$, followed by a descriptor synchronized to the transmit FIFO stall which disables the receive FIFO $37_r$. By selectively enabling and disabling the receive FIFO $37_r$ in this manner, it can be ensured that the last (most recently) received word in the receive FIFO $37_r$ can be known to be the required response data. Because the required word is guaranteed to be the last in the receive FIFO $37_r$, then the receive FIFO's stall mechanism or other underflow mechanism will indicate when the desired word has been shifted out of the receive FIFO $37_r$. This removes the need for the CPU to interrupt normal execution flow to process received data or to interrogate a large buffer of received data, either of which can adversely affect performance.

As discussed, the stalling properties of the system prevent data being written to the transmit FIFO until it is able to accept data, and prevent the receive FIFO from being invalidly read until it has data available. The following example will be described in terms of FIFOs which stall when they are full or empty, but it will be understood that some system architectures have FIFOs with programmable stall thresholds and in that case it is the programmed stall threshold that is relevant, not the absolute threshold.

The described method applies to slave devices, whereby a read is initiated by the master and a word transmitted across the interface directly relates to a word received in response. The slave cannot autonomously send data to the master, and the timing of the response relative to the read request is predictable to the master. This kind of interface includes, but is not limited to, SPI.

The following describes a sequence of descriptors to be processed by the DMA engine 14 in order to perform a slave access according to an embodiment of the present invention. All descriptors in the sequence are synchronized to the transmit FIFO stall unless otherwise stated. To minimize CPU overhead, a series of linked descriptors may be used to implement the sequence, i.e., so that the CPU 4 only has to set up a first descriptor in the sequence and the DMA engine 14 then autonomously follows links to from one descriptor in the sequence to the next. However, in principle the CPU could set up more or all of the descriptors individually (although that would waste CPU overhead).

(i) The first descriptor operates the DMA engine 14 to supply the desired read request word into the transmit FIFO $37_t$ of the interface 20. This is the read request word which when transferred to the slave device 40 will return the required read data in response.

(ii) Following the read request, the next descriptor is a special control descriptor which when processed by the DMA engine 14 operates it to enable the receive FIFO $37_r$ to receive data. Depending on system architecture, this may actually require a chain of descriptors, in which case only the first need be synchronized to the transmit FIFO stall. The receive FIFO $37_r$ is thus enabled to receive data from the slave 40.

(iii) Following the enable descriptor(s), next in the sequence are a chain of descriptors which operate the DMA engine 14 to supply enough subsequent words to the transmit FIFO $37_t$ to fill it to its maximum capacity, i.e. to supply a number of "stall words" equal to the stall threshold of the transmit FIFO $37_t$. These stall words can be all "dummy" read requests to the slave, which fill up slots in the transmit FIFO $37_t$ and may be transmitted to the slave 40 but need not return any particular required data in response. They may return arbitrary responses, null responses, or no response at all. That is, they are redundant request words whose responses are irrelevant and not used by any other component of the circuit 2. However, in principle there is no reason why some or all of the stall words cannot request data desired for subsequent reads, as long as there are the correct number of them to exactly fill the transmit FIFO $37_t$ to its stall threshold. E.g. it would also be possible to optimize by using real read request words then using only enough dummies to reach the stall threshold.

(iv) Following the stall chain, the final descriptor in the chain is another special control descriptor which when processed by the DMA engine 14 operates it to disable the receive FIFO $37_r$ from receiving data. Depending on system architecture, this may actually require a chain of descriptors, in which case only the first need be synchronized to the transmit FIFO stall. The receive FIFO $37_r$ is thus disabled from receiving any further data from the slave 40.

By means of the above sequence of descriptors, it can be guaranteed that the last word in the receive FIFO $37_r$ (i.e., the rear-most, most recently received word) is the response required. Whichever slot of the receive FIFO $37_r$ the required response word ends up in (which depends on how many other words are already in there ahead of it from any earlier reads), it can be assured that there are none others behind it because of the final disabling of the receive FIFO $37_r$ synchronized relative to the stall of the transmit FIFO $37_t$.

Once this is achieved, the stall or other underflow mechanism of the receive FIFO $37_r$ can be used to find and read the required response word out of the receive FIFO $37_r$ into the interior of the chip 2.

One option is for the CPU 4 to read from the receive FIFO $37_r$ until it is empty, i.e. until the CPU 4 detects that the FIFO $37_r$ has stalled (the stall signal may be made available to the CPU 4 via its connection to the control block 24 of the DMA engine 14). The last word read out before detecting the receive FIFO stall signal will be the required response word, and apart from that last (rear-most) word all other earlier data can be discarded (or in the case of a programmable lower stall threshold, the position of the last word can be found relative to the stall signal). This technique should be applicable to all systems and requires only minimal CPU overhead.

An alternative option applies to some system architectures which are configured such that, on underflow, the receive FIFO $37_r$ will return the last valid word. That is, if the CPU 4 or DMA engine 14 attempts to read from the front-most slot when empty, the receive FIFO $37_r$ instead returns the most recent contents of that slot. In this case, an unsynchronized DMA of length equivalent to the stall threshold of the receive FIFO $37_r$ from the receive FIFO $37_r$ would return the required read data. This technique would require no CPU overhead.

The operation of the above sequence is now described in more detail with reference to FIGS. 6a-6c. These show an example of a transmit FIFO $37_t$ having a stall threshold of four slots (i.e., maximum capacity of read request four words), and a receive FIFO $37_r$ also of size four slots. The descriptor sequence is then:

| Cycle | Descriptor Function |
|---|---|
| 1) | Read request |
| 2) | Enable Rx FIFO |
| 3) | $1^{st}$ stall word |
| 4) | $2^{nd}$ stall word |
| 5) | $3^{rd}$ stall word |
| 6) | $4^{th}$ stall word |
| 7) | Disable Rx FIFO |

The method begins at an initial stage before any of the DMA descriptors of the above sequence have been processed. However, for illustrative purposes, the words which will be supplied by the DMA engine 14 to the transmit FIFO $37_t$ once the corresponding descriptors have been fetched and processed are shown "in limbo" in FIGS. 6a-6c under the column marked "DMA side". The read request word, i.e., the word which will request the desired data, is shown cross-hatched. The stall words (e.g., dummy read request words) are shown dotted.

The transmit and receive FIFOs 37 may initially contain any number of words up to their stall thresholds. The contents of the FIFOs 37 are shown in the column marked "Interface FIFOs" in FIGS. 6a-6c. By way of example, the transmit FIFO $37_t$ in FIG. 6a begins empty and the receive FIFO $37_r$ begins with two words (shown dashed) in the front-most two slots, which are responses to earlier reads that have already been performed, perhaps by other conventional DMA methods.

Figure 6A:
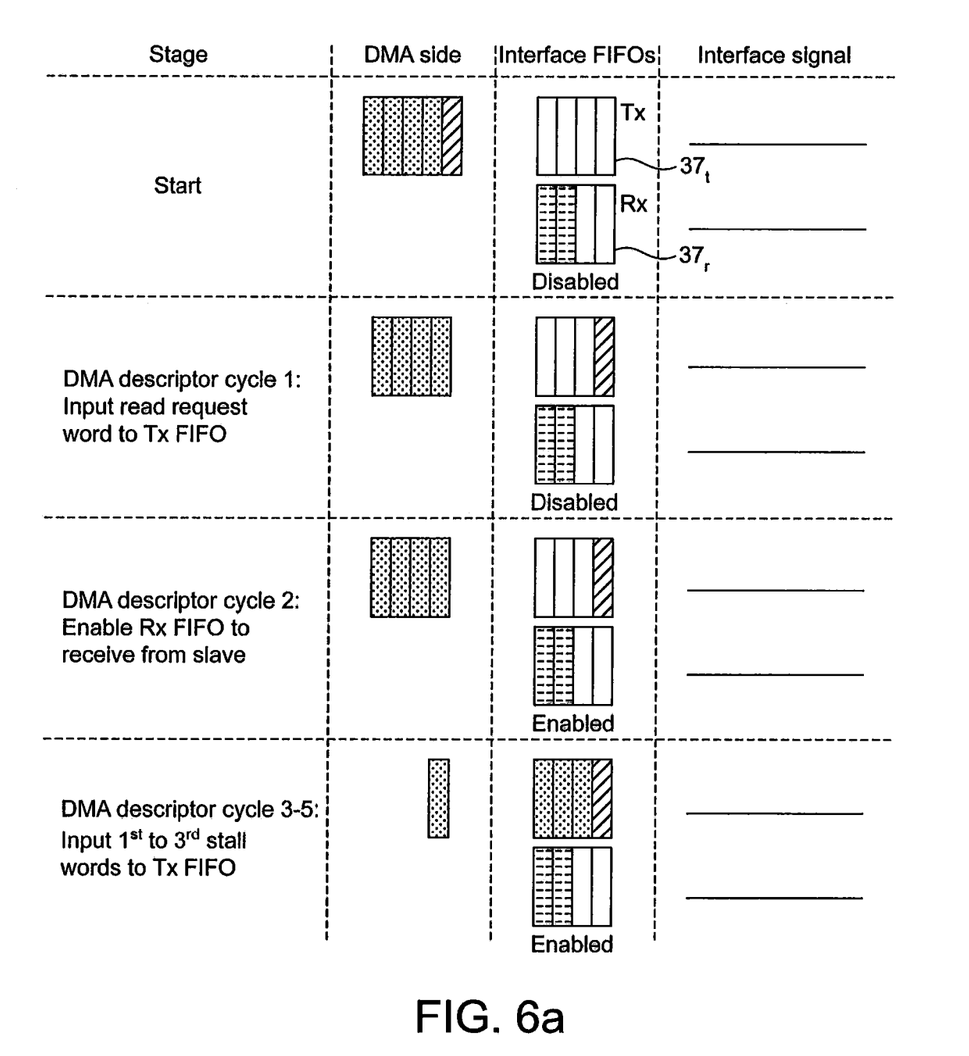
FIGS. 6a-6c show stages involved in reading a slave device.
Figure 6B:
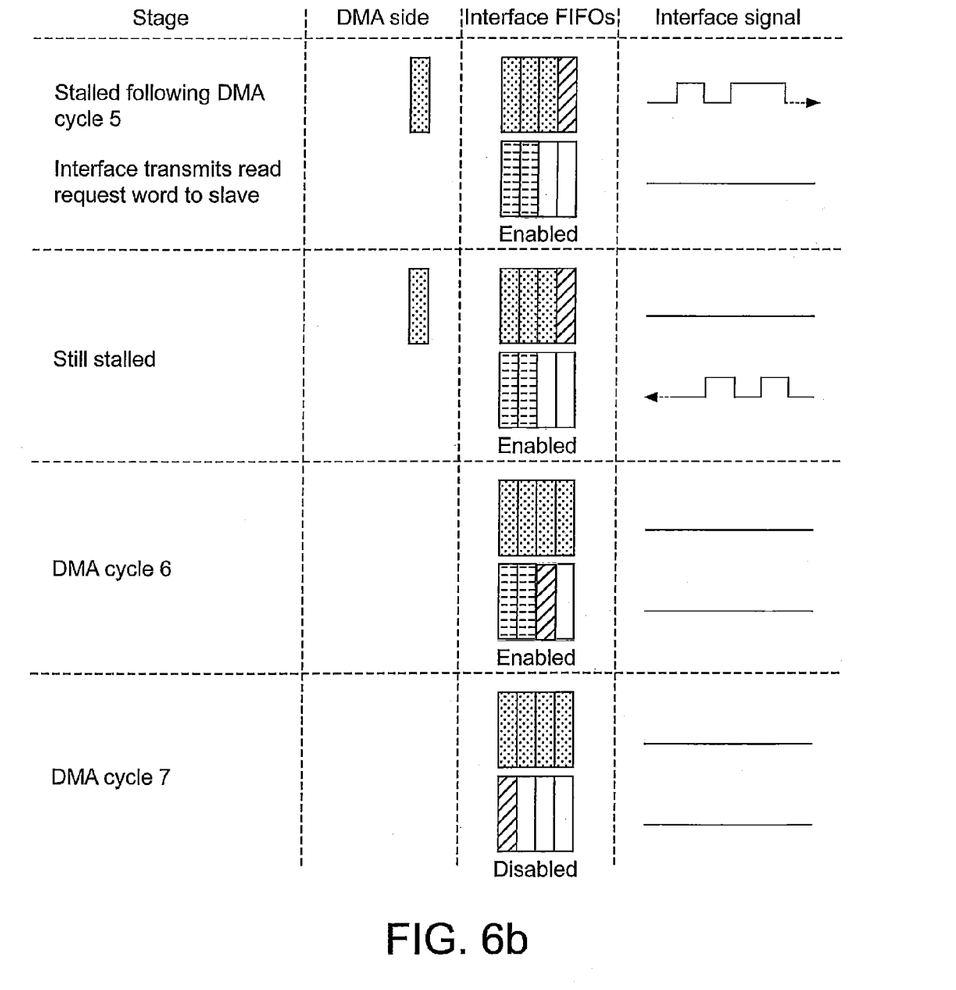
Figure 6C:
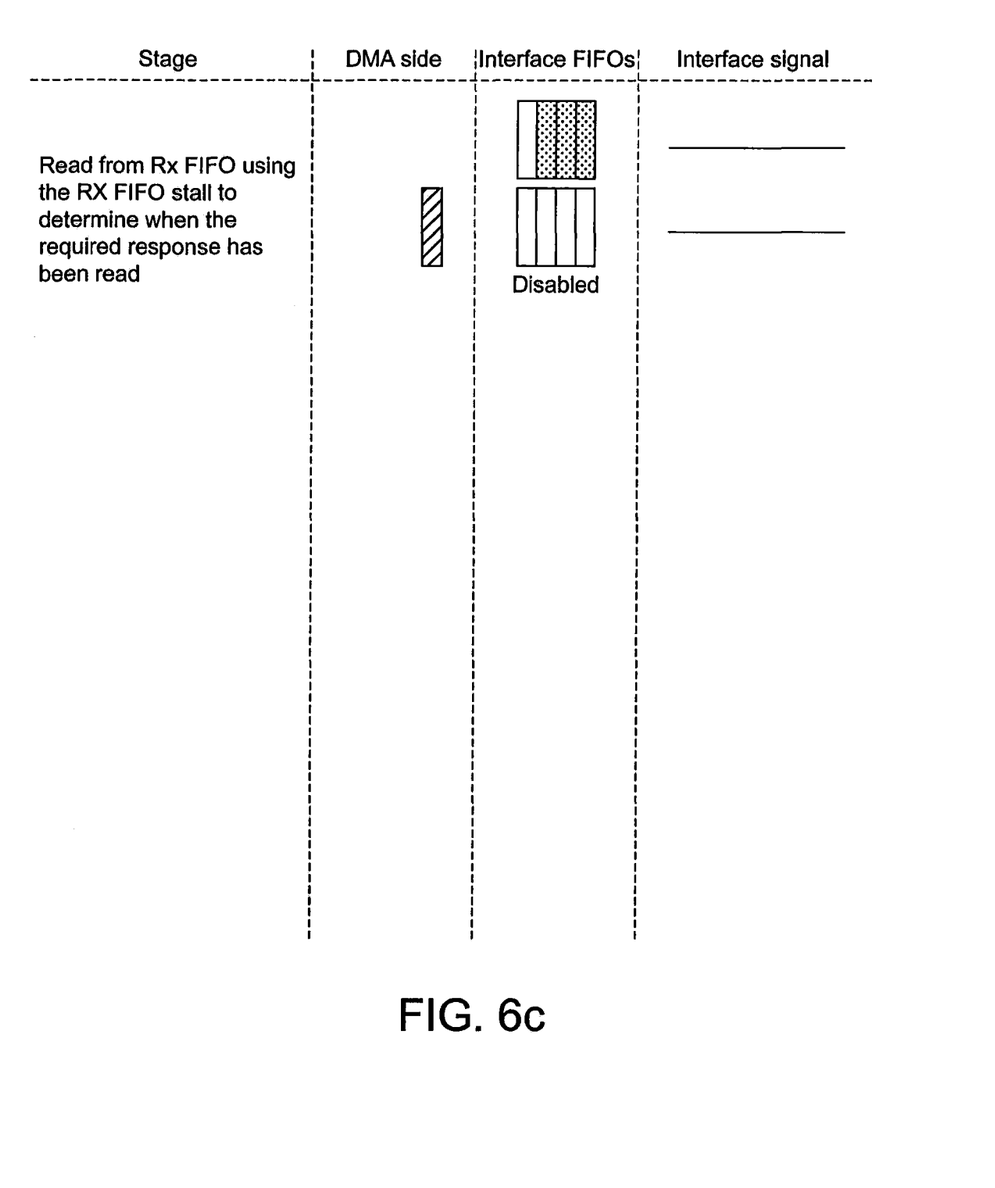

Activity on the external serial connections of the interface 20 to the slave 40 are shown in the column marked "interface" in FIGS. 6a-6c. In this example, as in SPI, the interface 20 is a full-duplex interface having separate connections in the transmit and receive directions so as to be able to transmit one bit while simultaneously receiving another. In the example shown, these connections begin inactive since there are no words yet ready to transmit or receive.

Referring to FIG. 6a, in a first descriptor processing cycle the DMA engine 14 processes the first descriptor in the sequence, which inputs the read request word (shown cross-hatched) into the rear-most slot of the transmit FIFO $37_t$ (leftmost in FIGS. 6a-6c). Since in this example the transmit FIFO $37_t$ begins empty, the read request word is quickly shifted through to the front-most slot (rightmost in FIGS. 6a-6c) where it is made available for transmission. However, remember that the transmission of a word to the slave 40 is slow relative to the descriptor processing cycle, so the DMA engine 14 can be considered to continue processing further descriptors before there is any significant activity across the interface. Remember also that a word is not cleared from the front-most slot of the transmit FIFO $37_t$ until it has been fully transmitted to the slave 40 and the corresponding response received back.

In a second descriptor processing cycle, the DMA engine 14 then processes the second descriptor in the sequence, which enables the receive FIFO $37_r$ to receive data from the slave 40 (as mentioned, this might actually require several descriptors to be processed, but for simplicity the enabling is described here in terms of only a single descriptor).

In subsequent third, fourth and fifth descriptor processing cycles the DMA engine 14 processes the third, fourth and fifth descriptors respectively, which input the $1^{st}$, $2^{nd}$ and $3^{rd}$ stall words (shown dotted) into the transmit FIFO $37_t$ behind the read request word. These are each quickly shifted forwards as far as possible through the transmit FIFO $37_t$ so as to queue them up behind the read request word.

Referring now to FIG. 6b, the transmit FIFO $37_t$ is now stalled because it is full. This means the stall signal is asserted on the transmit stall wire $33_t$ and thus inhibits the relevant context 32 of the DMA engine 14 from processing any further descriptors in the sequence which input to the transmit FIFO $37_t$ (although of course other contexts 32 may continue processing other parallel sequences of descriptors relating to other targets). In this sequence, the next (sixth) descriptor is that which inputs the $4^{th}$ stall word to the transmit FIFO $37_t$, and therefore the sequence is suspended pending release of the stall. Note again that the sequence must be processed in order, so the stall also prevents the following (seventh) descriptor from disabling the receive FIFO $37_r$ at this point. The relevant context must wait until the read request word has been fully transmitted to the slave 40 and the corresponding response word has been received back before the request word is cleared from the front slot of the transmit FIFO $37_t$ and therefore the stall signal on the transmit stall wire $33_t$ is de-asserted and the context can move onto the next (sixth) descriptor processing cycle to process the sixth descriptor in the sequence. In this sense, the descriptors of the sequence are the to be synchronized to the transmit FIFO stall.

(Note: the transmission of the read request word can actually begin immediately after the first descriptor cycle, but since that transmission is slow compared to the processing of DMA descriptors then it has been schematically assumed in FIGS. 6a-6c that no significant transmission begins until after the fifth descriptor cycle.)

In response to receiving the read request word, the slave 40 begins to send back the desired corresponding response word bit-by-bit to the interface 20 (this corresponding response is shown cross-hatched to represent the fact that it is a response to the cross-hatched read request). Once fully received, the read response word is shifted into the rear-most slot of the receive FIFO $37_r$ (right-most in FIGS. 6a-6c), and then quickly shifted through to the front-most unoccupied slot (left-most unblocked in FIGS. 6a-6c). In the example shown, this is the third slot from the front of the receive FIFO $37_r$, since the two front-most slots already contain response words from previous reads (shown dashed).

Once the transmit FIFO $37_t$ has fully transmitted the read request word and the corresponding response word has been fully received back in the receive FIFO $37_r$, then the front-most slot of the transmit FIFO $37_t$ is cleared and each of the remaining words (the $1^{st}$ to $3^{rd}$ stall words) are shifted forwards by one slot in the queue, thus making room for another word in the rear-most slot. This un-stalls the transmit FIFO $37_t$, allowing the relevant context 32 of the DMA engine 14 to continue to process the sixth descriptor in the sequence. This sixth descriptor inputs the $4^{th}$ stall word into the rear-most slot of the transmit FIFO $37_t$, filling it again and thus causing it to stall again. However, the next (seventh) descriptor in the sequence is a special control descriptor which does not attempt to supply data to the transmit FIFO $37_t$, and thus is not inhibited by the stall from being processed. Thus the DMA engine 14 permits the relevant context 32 to continue to the seventh DMA cycle where it processes the seventh and final descriptor, which disables the receive FIFO $37_r$ from receiving further data from the slave 40.

Because the number of stall words has been deliberately arranged to be equal to the stall threshold of the transmit FIFO $37_t$, then this disable descriptor is synchronized to be processed just after the desired response word has been received back into the receive FIFO $37_r$ of the interface 20 but before any further response words can be received back.

Because the receive FIFO $37_r$ is now disabled, and because the disabling descriptor was synchronized by the chain of stall words to be processed immediately following the return of the required response, then advantageously it can be known that the last word in the receive FIFO $37_r$ (i.e., the most recently received word in the rear-most occupied slot) must be the desired read response word corresponding to the read request word that was supplied at the head of the sequence. Therefore however many words are in the receive FIFO $37_r$ ahead of the required response word, the stall signal or other underflow mechanism of the receive FIFO $37_r$ can be used to find the required response with minimal or no CPU overhead.

Referring now to FIG. 6c, this can be achieved by operating the CPU 4 to read the words in turn out of the front of the receive FIFO $37_r$ until it detects a stall signal being asserted from the receive FIFO $37_r$, indicating it is empty. The CPU 4 can then know that the last word read out before detecting the receive buffer's stall signal is the desired response word, and all preceding words may be discarded (or if a programmable lower stall threshold is used, the desired response word can be found relative to the stall signal). This technique requires option only minimal CPU overhead.

Alternatively, if the system architecture is configured such that on underflow the receive FIFO $37_r$ returns the last valid word, then an unsynchronized DMA transfer of a length equivalent to the stall threshold of the receive FIFO $37_r$ will return the required word. This can be achieved with no CPU overhead at all.

Thus by selectively enabling and disabling data reception it is possible to ensure that in the worse case, the minimum amount of data need be interrogated; and in the best case no CPU interaction is required at all. This has the benefit of reducing overall CPU load and having no impact on any real-time software constraints.

Note also that it is irrelevant how many words begin in the transmit FIFO $37_t$ before the above sequence is initiated. What matters is that the sequence guarantees that the last word received will be the read data requested.

The principles of the present invention may be particularly applicable to a soft modem. As mentioned, the principles of the present invention allow CPU overhead to be reduced when low throughput is required from the slave 40 and its interface 20. In a soft modem, a large amount of the CPU's processing capacity may be taken up with high-throughput, real-time RF communications via the RF interface 22 and the corresponding signal processing, in which case it may be particularly desirable to reduce the CPU overhead spent servicing other interfaces 20 which would typically require or tolerate lower throughput.

It will be appreciated that the above embodiments are described only by way of example. In other embodiments for instance, the principles of the invention may have other applications than a software modem. Further, note that different length chains of stall words may be required to properly synchronize the disable descriptor(s), depending on system architecture. For example, if the front-most slot of the transmit FIFO is arranged to clear immediately upon beginning transmission, then an extra stall word may be required. Further, note that the term "word" is not necessarily used to refer to data of any specific size, but rather any discrete unit of data of some predetermined size. Further, the various embodiments of the invention are not limited only to serial interfaces, but can apply to any "slow" interface that is slow relative to the DMA and CPU side. Therefore in principle, embodiments of the invention can also include a slow parallel interface (although such interfaces are less common). Other applications and configurations may be apparent to the person skilled in the art given the disclosure herein. The scope of the invention is not limited by the described embodiments, but only by the following claims.

What is claimed is:

1. A method of accessing a slave device from a circuit comprising a central processing unit, a data transfer engine, and an interface to the slave device; the method comprising:
   executing code on said central processing unit to set up the data transfer engine to access said slave device;
   based on said set-up, operating the data transfer engine to supply a read request word to a slot of a transmit buffer of the interface for transmission to the slave device, said slave device generating a corresponding response word related to said read request word and, after return of said corresponding response word to a first-in-first-out receive buffer of the interface, to free said slot of said transmit buffer to disable said first-in-first-out receive buffer from receiving any further data such that the last word therein is assured to be said response word; and
   using an underflow mechanism of said first-in-first-out receive buffer to determine the last word therein and hence determine said response word.

2. The method of claim 1, wherein: said transmit buffer is a first-in-first-out buffer; said operation of the data transfer engine comprises, based on said set up, processing a sequence of descriptors in the data transfer engine; and the processing of the sequence of descriptors comprises:
   processing a first descriptor operating the data transfer engine to input said read request word into the first-in-first-out transmit buffer;
   processing one or more subsequent descriptors operating the data transfer engine to input a number of additional words into the first-in-first-out transmit buffer behind the read request word, the number being at least sufficient to fill said first-in-first-out transmit buffer to an upper stall threshold and arranged so as to generate a stall until said response word has been returned from the slave device; and
   following said subsequent descriptors in the sequence and synchronized to release of said stall of the first-in-first-out transmit buffer, processing one or more control descriptors operating the data transfer engine to perform said disabling of the first-in-first-out receive buffer.

3. The method of claim 2, wherein said number is equal to the stall threshold of said first-in-first-out transmit buffer.

4. The method of claim 2, wherein the processing of the sequence of descriptors comprises:
   prior to said subsequent descriptors in the sequence, processing one or more control descriptors operating the data transfer engine to enable the first-in-first-out receive buffer to receive data.

5. The method of claim 3, wherein the processing of the sequence of descriptors comprises:
   prior to said subsequent descriptors in the sequence, processing one or more control descriptors operating the data transfer engine to enable the first-in-first-out receive buffer to receive data.

6. The method of claim 2, wherein said sequence comprises a series of linked descriptors, each operating the data transfer engine to process the next in the sequence, and said set-up by the processor comprises identifying only an initial descriptor in the sequence.

7. The method of claim 3, wherein said sequence comprises a series of linked descriptors, each operating the data transfer engine to process the next in the sequence, and said set-up by the processor comprises identifying only an initial descriptor in the sequence.

8. The method of claim 2, wherein at least one of said additional words comprises a dummy read request word.

9. The method of claim 1, wherein said underflow mechanism comprises a stall mechanism whereby a stall is generated when the first-in-first-out receive buffer contains fewer words than a lower stall threshold, and the determination of said last word comprises executing code on said central processing unit to read from the first-in-first-out receive buffer until empty, the central processing unit determining when the first-in-first-out receive buffer is empty by reference to said stall of the first-in-first-out receive buffer.

10. The method of claim 1, wherein said underflow mechanism is configured to output the last validly read word upon underflow of the first-in-first-out receive buffer, and the determination of said last word comprises operating the data transfer engine to read a number of words from the first-in-first-out receive buffer sufficient to cause underflow.

11. The method of claim 2, wherein the upper stall threshold of the first-in-first-out transmit buffer is its maximum capacity in words such that it stalls when full.

12. The method of claim 2, wherein the upper stall threshold of the first-in-first-out transmit buffer is a programmable, such that it can be set to a number of words less than a maximum capacity of the transmit buffer.

13. The method of claim 9, wherein the lower stall threshold of the first-in-first-out receive buffer is zero words such that it stalls when empty.

14. The method of claim 9, wherein the lower stall threshold of the first-in-first-out receive buffer is programmable, such that it can be set to greater than zero words.

15. The method of claim 1, comprising executing code on said central processing unit to operate the circuit as a wireless modem.

16. A circuit comprising:
a central processing unit;
an interface for accessing a slave device, the interface comprising a transmit buffer for transmitting to the slave device, a first-in-first-out receive buffer for receiving from the slave device, and an underflow mechanism associated with the first-in-first out receive buffer;
a data transfer engine coupled between the interface and the central processing unit; and
a memory, coupled to the central processing unit, storing code arranged to be executed on the central processing unit to set up the data transfer engine to access the slave device by: based on said set-up, operating the data transfer engine to supply a read request word to a slot of the transmit buffer of the interface for transmission to the slave device, said slave device generating a corresponding response word related to said read request word and, after return of said corresponding response word to the first-in-first-out receive buffer of the interface, to free said slot of said transmit buffer to disable said first-in-first-out receive buffer from receiving any further data such that the last word therein is assured to be said response word; and use the underflow mechanism of said first-in-first-out receive buffer to determine the last word therein and hence determine said response word.

17. The circuit of claim 16, wherein said transmit buffer is a first-in-first-out buffer; the circuit comprises a memory storing a sequence of descriptors; said code is arranged so as when executed to set up the data transfer engine by indicating to it the sequence of descriptors; the data transfer engine is arranged to process of the indicated sequence of descriptors; and the sequence of descriptors comprises:
a first descriptor configured to operate the data transfer engine to input said read request word into the first-in-first-out transmit buffer;
one or more subsequent descriptors configured to operate the data transfer engine to input a number of additional words into the first-in-first-out transmit buffer behind the read request word, the number being at least sufficient to fill said first-in-first-out transmit buffer to an upper stall threshold and arranged so as to generate a stall until said response word has been returned from the slave device; and
following said subsequent descriptors in the sequence, one or more control descriptors configured to operate the data transfer engine to perform said disabling of the first-in-first-out receive buffer, wherein the data transfer engine is configured such that the processing of said one or more control descriptors is synchronized to release of said stall of the first-in-first-out transmit buffer.

18. The circuit of claim 17, wherein said number is equal to the stall threshold of said first-in-first-out transmit buffer.

19. The circuit of claim 17, wherein the sequence of descriptors comprises:
prior to said subsequent descriptors in the sequence, one or more control descriptors configured to operate the data transfer engine to enable the first-in-first-out receive buffer to receive data.

20. The circuit of claim 17, wherein said sequence comprises a series of linked descriptors, each configured to operate the data transfer engine to process the next in the sequence, and said code is arranged so as when executed to set up the data transfer engine by indicating to it only an initial descriptor in the sequence.

21. The circuit of claim 17, wherein at least one of said additional words comprises a dummy read request word.

22. The circuit of claim 16, wherein said underflow mechanism comprises a stall mechanism whereby a stall is generated when the first-in-first-out receive buffer contains fewer words than a lower stall threshold, and the determination of said last word comprises executing code on said central processing unit to read from the first-in-first-out receive buffer until empty, the central processing unit determining when the first-in-first-out receive buffer is empty by reference to said stall of the first-in-first-out receive buffer.

23. The circuit of claim 16, wherein said underflow mechanism is configured to output the last validly read word upon underflow of the first-in-first-out receive buffer, and the determination of said last word comprises operating the data transfer engine to read a number of words from the first-in-first-out receive buffer sufficient to cause underflow.

24. The circuit of claim 17, wherein the upper stall threshold of the first-in-first-out transmit buffer is its maximum capacity in words such that it stalls when full.

25. The circuit of claim 17, wherein the upper stall threshold of the first-in-first-out transmit buffer is a programmable, such that it can be set to a number of words less than a maximum capacity of the transmit buffer.

26. The circuit of claim 22, wherein the lower stall threshold of the first-in-first-out receive buffer is zero words such that it stalls when empty.

27. The circuit of claim 22, wherein the lower stall threshold of the first-in-first-out receive buffer is programmable, such that it can be set to greater than zero words.

28. The circuit of claim 16, comprising a memory storing code arranged to be executed on said central processing unit to operate the circuit as a wireless modem.

29. A computer program product for accessing a slave device from a circuit comprising a central processing unit, a data transfer engine, and an interface to the slave device; the program comprising code stored on non-transient computer readable medium and configured so as when executed on the central processing unit to:
- set up the data transfer engine to access the slave device;
- based on said set-up, operate the data transfer engine to supply a read request word to a slot of a transmit buffer of the interface for transmission to the slave device, said slave device generating a corresponding response word related to said read request word and, after return of said corresponding response word to a first-in-first-out receive buffer of the interface, to free said slot of said transmit buffer to disable said first-in-first-out receive buffer from receiving any further data such that the last word therein is assured to be said response word; and
- use an underflow mechanism of said first-in-first-out receive buffer to determine the last word therein and hence determine said response word.

* * * * *